Jan. 6, 1925.

J. KATONA 1,521,818

AUTOMOTIVE SLED

Filed Jan. 11, 1924

JULIUS KATONA
Inventor

By his Attorney Julian J. Wittal

Patented Jan. 6, 1925.

1,521,818

UNITED STATES PATENT OFFICE.

JULIUS KATONA, OF NEW YORK, N. Y.

AUTOMOTIVE SLED.

Application filed January 11, 1924. Serial No. 685,564.

*To all whom it may concern:*

Be it known that I, JULIUS KATONA, a citizen of Hungary, and resident of New York, in the county of New York and State of New York, have invented certain new and useful Improvements in Automotive Sleds, of which the following is a specification.

This invention relates to sleds and has for its main object to provide a sled with improved propelling and steering means. My sled is especially intended for children and juveniles for coasting and sliding therewith on snow or ice covered surfaces in the winter.

Another object of the invention is to provide a sled which will have the general appearance of an automobile, will have steering means similar to the ones applied on automobiles and thereby be especially interesting and attractive to children.

Still a further object of this invention is to provide a device of the mentioned character which will be comparatively simple in construction, reliable in operation, durable in use, and inexpensive to manufacture, so as to make this healthful game accessible to the greatest number of children, and adults as well.

Other objects of the invention will be apparent as the specification of the same proceeds.

With such objects in view, my invention mainly resides in practically dividing the usual running equipment of a sled into two portions, the rear portion of my sled being the runner and the supporting frame itself, and the front portion of the same constituting the steering equipment. The two portions I intend to firmly secure to one another by a pivoted connection and provide means to turn the front portion in relation to the rear portion and thereby give the whole structure the desired direction. In addition to this equipment and arrangement for steering my device, the rear portion is further provided with pedal operated propelling means, as will be more fully described hereinafter.

In the accompanying drawings, forming a part of this specification:

Figure 1:
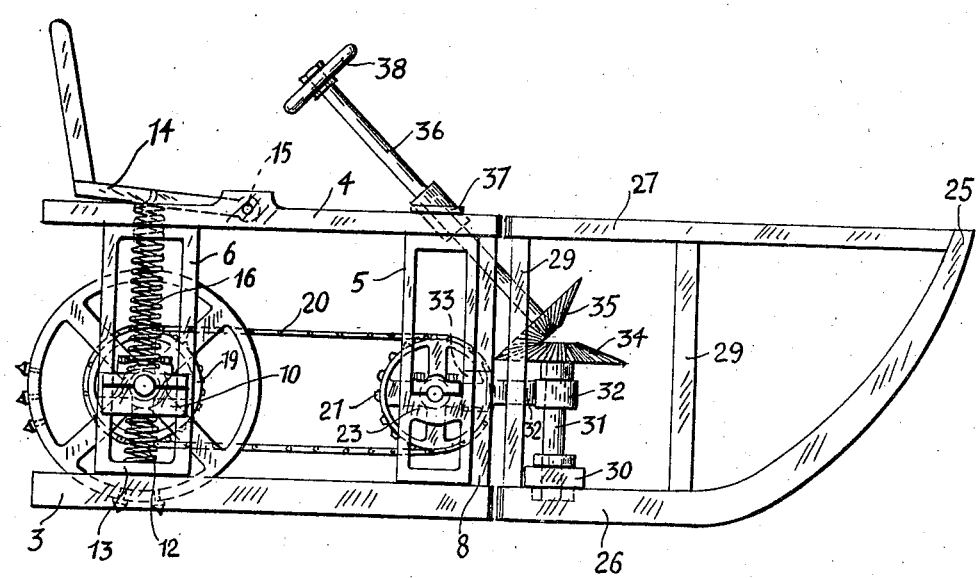
Fig. 1 is a side elevational view of my assembled complete sled, portions of the same being shown in a semi-diagrammatic manner, while—
Figure 2:
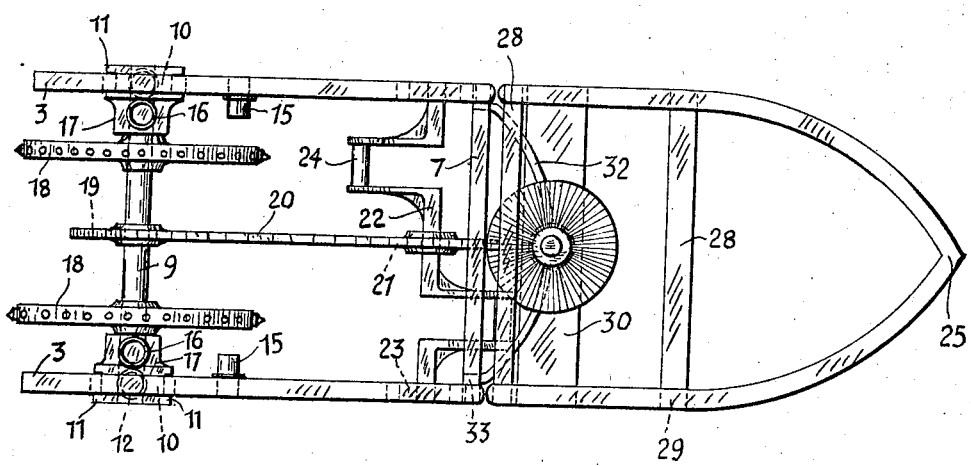
Fig. 2 is a similarly executed plan view of it, all structures of the steering post and part of the seat having been removed for the sake of clearness.

Referring more closely to the drawings, the numeral 3 indicates the rear runners of my sled, being two in number, and constituting the supporting members proper of my device. Coplanarly with said supporting runners and at an appropriate distance above them are two main supporting frame members 4, connected with the supporting runners 3 by the bearing frames 5 and 6. Further bracing members 7 and 8 may also be used between the upper supporting frame members 4, and between them and the runners 3, respectively. The propelling mechanism of my sled is mounted within the frame thus formed and will be described presently.

A propelling shaft 9 is mounted transversely between the rear bearing frames 6 and journaled in bearings 10 of any suitable design, arranged slidably in frames 6, for which purpose the vertical sides of the frames are embraced by guide extensions 11 of said bearings. Spiral springs 12 are interposed between the lower horizontal sides 13 of the frames 6, secured to the runners 3, and the undersides of bearings 10, so that any weight acting on the axle 9 will exert a spring adjusted and controlled downward force on the runners 3. This downward force or weight will be placed upon the shaft 9 by the weight of the user, since the seat 14 of my sled is arranged oscillatingly around the pivots 15 and is further secured by the spiral springs 16 resting on the inward extensions 17 of bearings 10. The propelling action will be developed by two propelling or gripping wheels 18, of construction made obvious by the drawings, and secured on the axle 9, so that while they will steadily and effectively grip the slippery surface upon which the sled is moving, at the same time they are enabled to yield to any unevenness encountered on said surface.

Axle 9 is driven by a sprocket wheel 19 fastened at the middle of the same and connected through chain 20 with a similar sprocket wheel 21, made fast on the crank shaft 22, journaled in the stationary bearings 23 of front bearing frames 5. Crank pins 24, or suitable pedals secured to them, may be used by the feet of the operator of my device, sitting on seat 14, for turning the crank shaft 22 and thereby imparting to the sled the desired forward motion.

For the steering I provide my sled with a front runner and frame construction executed in a somewhat similar manner to the rear supporting runners and frame of the same but having a pointed forward end 25. This steering frame may have two steering runners 26 and two upper members 27 converging to the forward point 25 and having intermediate bracing members, both in transverse and vertical directions, as at 28 and 29, respectively. A heavier transverse member 30 may be secured to the steering runners 26, carrying a centrally located steering column 31. Said column is firmly secured in the cross member 30 and rotatably in the arched connecting member 32, the enlarged ends 33 of which are secured to the front end of the running rear frame of my device, said arched member thereby constituting the desired firm and pivoted connection between the running and steering portions of my sled. The steering action proper is executed by two bevel gears, the lower one of which is indicated by the character 34 and is secured to the column 31, while the upper one is marked by the numeral 35 and is secured at the end of a steering post 36, rotatably secured into a transverse member 37 of the rear or running and supporting structure of my sled and being provided with a steering handwheel 38.

I want to be understood that modifications may be made in the execution of my invention which nevertheless will fall under the scope of the same as defined in the appended claim.

Having thus described my invention, what I claim is:

A sled, comprising a pair of rear runners with a supporting frame built thereon, a shaft journaled in bearings arranged in said supporting frame and slidable in a vertical direction, supporting springs underneath said bearings resting on said runners, a seat pivotally mounted in said frame, springs interposed between said seat and said shaft, propelling wheels on said shaft, adapted to grip the surface upon which the sled is moving, a second driving shaft arranged in said frame in front and below said seat, sprocket wheels on said shafts and a chain connecting them, pedals adapted to operate said front driving shaft, a pair of front steering runners and a frame built thereon, a steering column rigidly fixed in said steering frame, an arched connecting member between said two frame structures, rotatably embracing said steering column and being secured to said rear frame structure by its ends, a bevel gear secured to the top of said steering column, a steering post rotatably secured into said rear frame structure, in front of said seat and having a bevel gear secured thereon, engaging the bevel gear on the steering column.

Signed at New York in the county of New York and State of New York, this 4th day of January, A. D. 1923.

JULIUS KATONA.